(12) United States Patent
Bartsch et al.

(10) Patent No.: US 9,104,322 B2
(45) Date of Patent: Aug. 11, 2015

(54) METHOD FOR ANNOUNCING A MEMORY CONFIGURATION

(75) Inventors: Armin Bartsch, Landsberg am Lech (DE); Fabian Guter, Feldkirchen (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 432 days.

(21) Appl. No.: 13/383,969

(22) PCT Filed: Jul. 15, 2010

(86) PCT No.: PCT/EP2010/060223
§ 371 (c)(1),
(2), (4) Date: Jan. 13, 2012

(87) PCT Pub. No.: WO2011/006968
PCT Pub. Date: Jan. 20, 2011

(65) Prior Publication Data
US 2012/0117279 A1    May 10, 2012

(30) Foreign Application Priority Data
Jul. 16, 2009 (DE) .......................... 10 2009 033 360

(51) Int. Cl.
*G06F 3/00* (2006.01)
*G06F 5/00* (2006.01)
*G06F 3/06* (2006.01)

(52) U.S. Cl.
CPC ............ *G06F 3/0632* (2013.01); *G06F 3/0605* (2013.01); *G06F 3/0622* (2013.01); *G06F 3/0673* (2013.01)

(58) Field of Classification Search
CPC .......... G06F 8/71; G06F 9/455; G06F 11/261
USPC ..................... 710/16, 10, 14, 30, 37
See application file for complete search history.

(56) References Cited

U.S. PATENT DOCUMENTS

| | | | |
|---|---|---|---|
| 6,738,834 B1 * | 5/2004 | Williams et al. .................. | 710/8 |
| 6,791,950 B2 | 9/2004 | Wu | |
| 7,328,144 B1 * | 2/2008 | Grier et al. ...................... | 703/22 |
| 7,500,027 B2 | 3/2009 | Wu | |

(Continued)

FOREIGN PATENT DOCUMENTS

| | | |
|---|---|---|
| CN | 1364265 A | 8/2002 |
| DE | 102007050463 | 5/2008 |

(Continued)

OTHER PUBLICATIONS

ISR and Preliminary Rerpot on Patentability of EPO regarding PCT/EP2010/060223, Oct. 14, 2010.

(Continued)

*Primary Examiner* — Idriss N Alrobaye
*Assistant Examiner* — Getente A Yimer
(74) *Attorney, Agent, or Firm* — Workman Nydegger

(57) ABSTRACT

The invention creates a method for enabling a terminal to determine an activated memory configuration of a storage medium that can be operated in the terminal. For this purpose an interruption and subsequent restoration of the contact existing at an interface of the storage medium between the storage medium and the terminal is—at least partly—simulated, wherein upon the simulation of the restoration or interruption of the contact the terminal is caused to determine the activated memory configuration of the storage medium.

16 Claims, 1 Drawing Sheet

(56) References Cited

U.S. PATENT DOCUMENTS

| | | | |
|---|---|---|---|
| 7,636,799 B2* | 12/2009 | Yang et al. | 710/15 |
| 7,930,164 B1* | 4/2011 | Grier et al. | 703/22 |
| 8,032,352 B2* | 10/2011 | Bitar et al. | 703/21 |
| 8,156,257 B2 | 4/2012 | Kobayashi | |
| 8,356,118 B2* | 1/2013 | Komoda | 710/13 |
| 2001/0017846 A1 | 8/2001 | Wu | |
| 2003/0236644 A1* | 12/2003 | Lara et al. | 702/121 |
| 2004/0030821 A1* | 2/2004 | Qiu | 710/315 |
| 2006/0129781 A1* | 6/2006 | Gellai et al. | 711/170 |
| 2007/0299994 A1* | 12/2007 | McGinnis | 710/62 |
| 2008/0021693 A1* | 1/2008 | Campbell et al. | 703/21 |
| 2008/0192592 A1* | 8/2008 | Murotani | 369/47.1 |
| 2009/0070092 A1* | 3/2009 | Dickens et al. | 703/21 |
| 2009/0089460 A1* | 4/2009 | Komoda | 710/13 |
| 2010/0049988 A1 | 2/2010 | Birman et al. | |
| 2011/0125933 A1 | 5/2011 | Kobayashi | |
| 2011/0202715 A1* | 8/2011 | Lee | 711/112 |

FOREIGN PATENT DOCUMENTS

| | | |
|---|---|---|
| DE | 102009032821 A1 | 4/2010 |
| EP | 1100018 | 5/2001 |
| EP | 2177994 A1 | 4/2010 |
| WO | 0148613 | 7/2001 |
| WO | 2009/022388 A1 | 2/2009 |
| WO | 2010049413 | 5/2010 |

OTHER PUBLICATIONS

Chinese Search Report from Chinese Application No. 2010800315514, Dec. 25, 2013, 2 pages.

European Office Action from EP Application No. 10737017.3, Mar. 31, 2015, 7 pages.

* cited by examiner

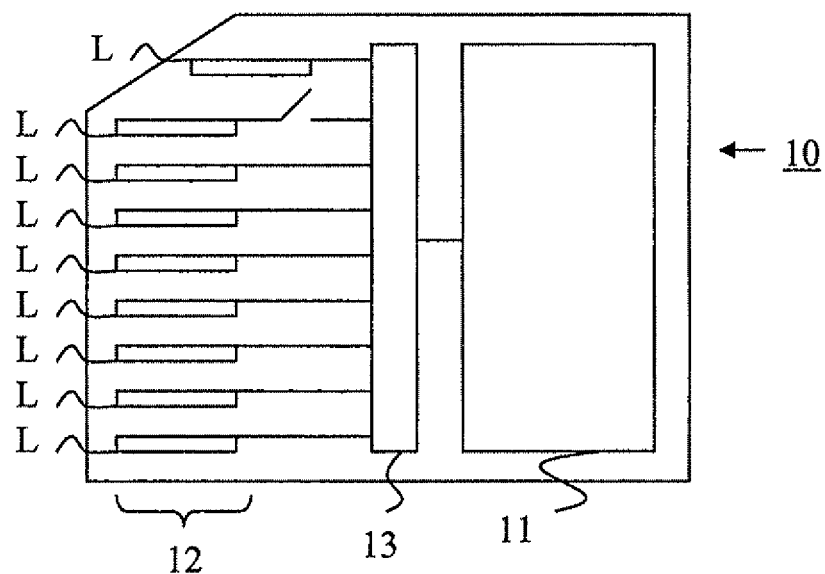

METHOD FOR ANNOUNCING A MEMORY CONFIGURATION

The invention relates to a method for announcing, to a terminal, an activated memory configuration of a storage medium that can be operated in the terminal, according to the preamble of claim 1.

Storage media in the sense of the invention are used for keeping available a great variety of data, for example applications for a great variety of areas of use, or also media data such as photos or films. The storage medium is configured so as to be portable and can be outwardly configured as a flat card or alternatively as a token.

The storage medium has a storage area (mass memory) and a memory management system, e.g. a memory controller or a system of several coupled memory controllers through which the storage area is managed. The memory management system here can also be integrated in the storage area of the storage medium. In the storage area the data are stored. The storage area can be structured into partial storage areas. The memory management system makes available a set of commands containing a plurality of predefined commands with which the tasks of the memory management can be carried out, such as for example the reading (READ) or writing (WRITE) in the storage area, the opening of storage parts (OPEN) or the setting and removal of write protection for the storage area.

The storage area can in principle be realized in any suitable—preferably electrical—storage technology, in particular as a flash memory, but also as a RAM, ROM or EEPROM.

Concrete commands are for example specified in different interface standards fulfilled by the storage medium. Some examples for interface standards are SD (secure digital memory card), MMC (multimedia card), USB (universal serial bus), SCSI (small computer system interface). In the following a storage medium is viewed partly by means of the example of the interface standard SD. Analogously this applies to storage media according to other interface standards.

Storage media according to the SD interface standard are described e.g. in "SD Specifications, Part 1, Physical Layer Specification" (http://www.sdcard.org) (in the following referred to as "SD Spec"). The SD storage medium has a set of predefined commands.

The portable storage medium can be read out and written by means of a terminal. As terminal for example a PC (personal computer), a mobile terminal for a mobile telephony network, e.g. a mobile phone, PDA, smart phone etc., or a set-top box for pay TV are provided. The terminal has an operating system, e.g. a PC operating system or an operating system for mobile terminals such as for example Microsoft Windows, Microsoft Windows Mobile, Linux, Symbian or the like.

The German patent application 102008053581.8 of the applicant of the present patent application describes a storage medium with a storage area and a memory management for managing the storage area, in which storage medium different memory configurations of the storage area are presettable in a flexible fashion and independently of a terminal used for operating the storage medium, in particular to protect data against deletion.

The storage medium according to 102008053581.8 has a storage area and a memory management system for managing the storage area. In the storage medium different access possibilities of accessing the storage area are provided. The memory management system comprises a configuration command whose execution effects an activation of one single out of at least two different activatable memory configurations. The different memory configurations differ from each other in that at least one access command for accessing the storage area is guided into a different partial storage area in dependence on the activated memory configuration. With the invention from 102008053581.8 the memory configuration of the storage medium can be preset or changed, in that selectively one of several activatable memory configurations can be activated. Only one single memory configuration can be activated at a time. The other memory configurations (one or several) are inactive in the meantime. So as to effect the activation the configuration command is called up and executed, optionally together with one (or several) parameter(s) specifying which of the memory configurations is to be activated. The configuration command is configured and optionally parameterized in such a fashion that the activatable memory configurations correspond to predefined wishes and requirements e.g. of the producer or issuer of the storage medium, thus offering a high degree of flexibility. For example the configuration command can be configured in such a fashion that in one of the activatable memory configurations physical partial areas of the storage area are completely hidden, thus not addressable, and/or hidden for writing, and thereby protected against deletion. In that the configuration command is implemented in the storage medium itself the different memory configurations additionally can be preset independently of a terminal used for operating the storage medium.

Conventionally through setting and deleting of write-protection bits different memory configurations can be preset for the complete storage area of a storage medium or for partial storage areas of the storage area.

To operate a storage medium in a terminal the terminal needs to know certain information of the storage medium, in particular e.g. information about a set write-protection bit of the storage area or optionally the currently activated memory configuration. Conventionally, upon inserting the interface of the storage medium into a slot of the terminal fitting the interface, the information relating to the storage medium, which is needed by the terminal to operate the storage medium, is determined by the terminal. The determination of the information takes place both upon a first insertion and upon removal and subsequent reinsertion of the storage medium.

In EP 1 100 018 A2 a method for simulating the reinsertion of a USB device is described. Here the voltage level of a signal line in the USB device is changed so that the host device with which the USB device is connected in an electrically conductive fashion presumes a disconnection and reinsertion of the USB device although the USB device physically has not been separated corporally from the host computer.

In a storage medium according to the invention in 102008053581.8 upon a bodily insertion of the storage medium into the terminal the currently activated memory configuration out of the several activatable memory configurations is determined by the terminal.

It is the object of the invention of the present patent application to specify a comfortable method for enabling a terminal to determine an activated memory configuration of a storage medium that can be operated in the terminal and opionally to switch between several memory configurations in the storage medium.

The object is achieved by a method according to claim 1. Advantageous embodiments of the invention are stated in the dependent claims.

The method according to the invention in accordance with claim 1 is provided to enable a terminal to determine an activated memory configuration of a storage medium that can be operated in the terminal. The storage medium has a storage area and an interface for communication of the storage medium with the terminal. Through the activated memory configuration characteristics of the storage area are predetermined. In the method the storage medium is held in or brought into contact with the terminal by means of the interface, so that at the interface a contact exists between the storage medium and the terminal, so that a communication is possible between the storage medium and the terminal via the interface. The method is characterized in that an interruption and subsequent restoration of the contact existing between the storage medium and the terminal at the interface is—at least partly—simulated, wherein upon simulating the restoration or interruption of the contact the terminal is caused to determine the current memory configuration of the storage medium.

The simulation of the interruption or restoration has—at least partly—an effect on the contact at the interface between the terminal and the storage medium similar to a corporal removal of the storage medium from the terminal or reinsertion of the storage medium into the terminal. The terminal is caused to determine the current memory configuration of the storage medium, like the terminal would do conventionally upon a corporal removal or reinsertion of the storage medium. A laborious actual corporal removal and reinsertion of the storage medium is not required here.

Therefore a comfortable method is created in accordance with claim 1 for enabling a terminal to determine an activated memory configuration of a storage medium that can be operated in the terminal.

Alternatively the terminal subsequently determines the activated memory configuration of the storage medium, e.g. in a fashion known in the art.

The storage medium is for example configured as an SD storage medium according to the SD Spec.

Alternatively the storage medium further has a control device coupled between the interface and the storage area, and wherein the simulation of the interruption and restoration of the contact existing between the storage medium and the terminal is carried out by the control device. In an SD storage medium the control device or a part thereof is configured for example as a card-interface controller according to the SD Spec.

Alternatively the interface has at least one or several lines coupled with the control device, to which signals can be fed for communication between the storage medium and the terminal. The interruption and subsequent restoration of the contact existing at the interface between the storage medium and the terminal is alternatively simulated in that such signals are fed to at least one or several lines of the interface by the control device which are fed to the one or several lines upon an actual interruption or restoration of the contact.

Alternatively such signals are fed to at least one or several lines of the interface which are fed to the one or several lines upon an actual interruption restoration of the contact, in that the one or several lines are decoupled from the control device by the control device and recoupled to the control device. Alternatively the interface has as a line a supply line and the supply line is or are decoupled from the control device by the control device and recoupled to the control device.

Alternatively such signals are fed to at least one or several lines of the interface which are fed to the one or several lines upon an actual interruption or restoration of the contact, in that an error message is fed to the one or several lines by the control device, like the control device would do upon an actual interruption or restoration of the contact. Alternatively the interface has as a line a command line and wherein the error message is fed to the command line.

Alternatively the removal or reinsertion is simulated in that the storage medium no longer reacts or reacts in a different fashion to certain signals and/or commands of the terminal for a certain time, i.e. a time relative to the clock frequency with which the storage medium or the terminal is operated. To put it differently, the simulation of the interruption and restoration of the contact existing between the storage medium (10) and the terminal is achieved in that a query and/or a command from the terminal to the storage medium is not replied to or wrongly replied to by the storage medium.

Alternatively the storage medium has several, at least two, activatable memory configurations, of which respectively only a single one can be activated at a time, wherein the memory configuration which is activated is the activated memory configuration and wherein further a memory configuration of the storage medium is activated, so that in the storage medium the activated memory configuration is preset.

Alternatively upon activation of the memory configuration, so that the activated memory configuration is preset in the storage medium, the interruption and subsequent restoration of the contact is simulated.

Alternatively the interruption and subsequent restoration of the contact is simulated after the activation of the memory configuration was carried out. At a time when the activated memory configuration is determined by the terminal, this is already the correct memory configuration, and not for example an old memory configuration which was preset (activated) before.

Alternatively at least the interruption of the contact—or the interruption and also the subsequent restoration of the contact—is simulated within a sufficiently short period of time before the activation of the memory configuration, so that at a time when the terminal is caused to determine the activated memory configuration of the storage medium, or when the terminal determines the activated memory configuration, the activated memory configuration is ready in the storage medium to be communicated to the terminal. The memory configuration is activated, in particular changed, only shortly after the simulated interruption and/or restoration of the contact. Nevertheless at the time when the activated memory configuration is determined by the terminal, like above this is already the correct memory configuration, and not for example an old memory configuration which was preset (activated) before, since the above-mentioned period of time is chosen to be sufficiently short.

In the following, the invention is explained in more detail with reference to embodiments and to the Figure, in which there is shown:

FIG. 1 a storage medium with which the method according to the invention can be carried out.

FIG. 1 shows a storage medium 10 with which the method according to the invention can be carried out. The storage medium 10 in a storage area 11 has an interface 12 with several (here nine) lines L, which lead to several (here nine) contact connectors for contacting with a terminal, as well as a control device (controller) 13 coupled between the storage area 11 and the interface 12. At least some of the lines L can be decoupled from the control device 13 by means of the control device 13 (indicated in FIG. 1 through a switch symbol in one of the lines). For a terminal coupled to the interface 12 through the decoupled state the impression arises that the storage medium 10 was removed from the terminal. Error messages can be fed to at least some of the lines L by means of the control device 13, although no conventional reason for an error message is given. For a terminal coupled to the interface 12 through the error message the impression arises that the storage medium 10 was removed from the terminal. In either case the terminal is provoked to determine the memory configuration of the storage medium.

The invention claimed is:

1. A method for enabling a terminal to ascertain an activated memory configuration of a non-transitory storage medium that is operable in the terminal, the method comprising the steps:
    simulating an interruption of a contact between the storage medium and the terminal;
    simulating a restoration of the contact existing at the interface between the storage medium and the terminal, the step of simulating the restoration of the contact being performed subsequent to the step of simulating the interruption of the contact; and
    causing the terminal to ascertain the activated memory configuration of the storage medium upon the simulation of the restoration of the contact or the simulation of the interruption of the contact, wherein the storage medium has a storage area and an interface for communication of the storage medium with the terminal,
    wherein the activated memory configuration includes predetermined configuration characteristics of the storage area of the storage medium, and
    wherein, when the method is carried out, the storage medium is held in contact with the terminal by the interface of the storage medium, so that the contact exists between the storage medium and the terminal at the interface of the storage medium, so that a communication is possible between the storage medium and the terminal via the interface
    wherein the storage medium includes a control device coupled with the interface, wherein the step of simulating the interruption and restoration of the contact existing between the storage medium and the terminal is carried out by the control device, and wherein the interruption and restoration of the contact existing at the interface between the storage medium and the terminal is simulated in a manner that signals are fed to at least one or several lines of the interface by the control device; and
    the method further comprises feeding such signals to the one or several lines upon occurrence of an actual interruption or restoration of the contact.

2. The method according to claim 1, wherein the interface has at least one or several lines coupled with the control device, to which said signals are fed for communication between the storage medium and the terminal.

3. The method according to claim 2, including feeding such signals to at least one or several lines of the interface upon an actual interruption or restoration of the contact, by decoupling the one or several lines from the control device by the control device and then recoupling the decoupled line to lines to the control device.

4. The method according to claim 3, wherein the line of the interface comprises a supply line, including the step:
    decoupling the supply line from the control device by the control device then recoupling the supply line to the control device.

5. The method according to claim 2, including feeding such signals to at least one or several lines of the interface and to the one or several lines upon an actual interruption or restoration of the contact, and feeding an error message is to the one or several lines by the control device in a manner that would be carried out by the control device upon an actual interruption or restoration of the contact.

6. The method according to claim 5, wherein the interface line comprises a command line, and including the step of feeding the error message to the command line.

7. The method according to claim 1, wherein the steps of simulating the interruption and restoration of the contact existing between the storage medium and the terminal is carried out by causing the storage medium to not reply to or to wrongly reply to a command from the terminal to the storage medium.

8. The method according to claim 1, wherein the storage medium has at least two activatable memory configurations, of which respectively a single one can be activated at a time, wherein the memory configuration which is activated is the activated memory configuration, including the steps of activating a memory configuration of the storage medium, so that in the storage medium the activated memory configuration is preset.

9. The method according to claim 8, wherein the interruption and subsequent restoration of the contact is simulated upon activating the memory configuration, so that the activated memory configuration is preset in the storage medium.

10. The method according to claim 9, wherein the interruption and subsequent restoration of the contact is simulated after the activation of the memory configuration was carried out.

11. The method according to claim 9, wherein at least the interruption of the contact or the interruption and the subsequent restoration of the contact is simulated for a sufficiently short period of time before the activation of the memory configuration, so that at a time when the terminal is caused to ascertain the activated memory configuration of the storage medium, or when the terminal ascertains the activated memory configuration, the activated memory configuration is ready in the storage medium to be communicated to the terminal.

12. The method according to claim 1, wherein the activated memory configuration is ascertained by the terminal.

13. A method for ascertaining an activated memory configuration of a non-transitory storage medium that is operable in the terminal, the method comprising:
    simulating an interruption of contact at an interface between the storage medium and the terminal;
    simulating a restoration of the contact at the interface between the storage medium and the terminal, the simulating of the restoration being subsequent to the simulating of the interruption; and
    upon the simulation of the restoration or interruption of the contact, causing the terminal to ascertain which memory configuration of the storage medium is activated, wherein the storage medium includes a control device coupled with an interface for communication of the storage medium with the terminal, wherein the step of simulating the interruption and restoration of the contact existing between the storage medium and the terminal is carried out by the control device, and wherein the interruption and restoration of the contact existing at the interface between the storage medium and the terminal is simulated in a manner that signals are fed to at least one or several lines of the interface by the control device; and
    the method further comprises feeding such signals to the one or several lines upon occurrence of an actual interruption or restoration of the contact.

14. The method according to claim 13, wherein the storage medium has a storage area.

15. The method according to claim 14, wherein configuration characteristics of the storage area are predetermined through the activated memory.

16. The method according to claim 13, wherein, when the method is carried out, the storage medium is in contact with the terminal by the interface so that communication is possible between the storage medium and the terminal via the interface.

* * * * *